United States Patent [19]
Akita et al.

[11] Patent Number: 6,124,060
[45] Date of Patent: Sep. 26, 2000

[54] SOLID POLYMER ELECTROLYTES

[75] Inventors: Hiroshi Akita; Masao Ichikawa; Katsutoshi Nosaki; Hiroyuki Oyanagi; Masaru Iguchi, all of Wako, Japan

[73] Assignee: Honda Giken Kogyo Kabushiki Kaisha, Tokyo, Japan

[21] Appl. No.: 09/313,010

[22] Filed: May 17, 1999

[30] Foreign Application Priority Data

May 20, 1998 [JP] Japan ................................. 10-153644

[51] Int. Cl.[7] ............................. H01M 6/18; H01M 8/10
[52] U.S. Cl. ....................... 429/307; 429/304; 429/310; 429/33; 429/30
[58] Field of Search .................................. 429/307, 304, 429/188, 306, 310, 30, 33

[56] References Cited

U.S. PATENT DOCUMENTS

| | | | |
|---|---|---|---|
| 2,895,948 | 7/1959 | Brinker et al. | 260/78.4 |
| 3,528,858 | 9/1970 | Hodgdon, Jr. et al. | 136/86 |
| 4,797,185 | 1/1989 | Polak et al. | 204/129 |
| 4,814,399 | 3/1989 | Sansone et al. | 525/435 |
| 5,403,675 | 4/1995 | Ogata et al. | 429/33 |
| 5,541,019 | 7/1996 | Anani et al. | 429/59 |

*Primary Examiner*—Maria Nuzzolillo
*Assistant Examiner*—Raymond Alejandro
*Attorney, Agent, or Firm*—Burgess, Ryan, Wayne

[57] ABSTRACT

This invention provides a solid polymer electrolyte which is low in water absorption, from which no dopant runs out even in pressing, and which is excellent in stability in the presence of water or methanol, proton conductivity and methanol barrier properties, in which an imidazole ring-containing polymer such as a polybenzimidazole compound is doped with an acid in which at least one hydrogen atom of an inorganic acid such as phosphoric acid is substituted by a functional group having a phenyl group by blending the imidazole ring-containing polymer with the acid in a solution using a solvent such as trifluoroacetic acid, preferably at a rate of 1 to 10 molecules of the acid per repeating structure unit of a molecular chain of the imidazole ring-containing polymer, the solid polymer electrolyte.

12 Claims, 2 Drawing Sheets

SOLID POLYMER ELECTROLYTES

FIELD OF THE INVENTION

The present invention relates to a solid polymer electrolyte, and more specifically, to an acid-doped solid polymer electrolyte used in fuel cells.

BACKGROUND OF THE INVENTION

In recent years, fuel cells have occupied an important position as novel type clean energy sources. And solid polymer electrolytes comprising solid polymer electrolyte membranes having high proton conductivity have been developed for retaining the characteristics of their high output capacity and high energy density, and for capability in miniaturization and weight saving. As the solid polymer electrolyte membranes, hydrated membranes such as a sulfonated polyfluoroolefin (trade name: Nafion, manufactured by E. I. du Pont de Nemours and Company) and acid-doped polybenzimidazole (PBI) membranes are generally known. When methanol is used as a fuel for operating fuel cells, the solid polymer electrolytes are required to have barrier properties to fuel methanol (low methanol permeability) However, the hydrated membranes such as Nafion have a limitation to methanol barrier properties due to occurrence of hydrated proton hopping. On the other hand, the acid-doped PBI membranes are homogeneous membranes. And it is considered that, in the acid-doped PBI membranes, proton hopping occurs through acids forming complexes with basic N—H groups in a base polymer, PBI. Accordingly, in the acid-doped PBI membranes, the proton hopping does not occur by the movement of water. The acid-doped PBI membranes have therefore been expected as the solid polymer electrolytes excellent in methanol barrier properties.

As acid-doped PBI membranes, for example, phosphoric acid-doped PBI membranes were prepared by immersing PBI membranes in phosphoric acid solutions [J. S. Wainright etal., J. Electrochem. Soc., Vol. 142, No. 7, p122, July (1995)]. Acid-doped PBI membranes were obtained by allowing acids to be adsorbed by PBI membranes in aqueous solutions of phosphoric acid or sulfuric acid (U.S. Pat. No. 5,525,436). And acid-impregnated PBI and acid-impregnated alkyl or arylsulfonated PBI membranes, or alkyl or arylsulfonated PBI membranes (Japanese Unexamined Patent Publication No. 9-73908) are proposed, and obtained phosphoric acid-doped PBI membranes show superior characteristics.

However, studies of these phosphoric acid-doped PBI membranes have revealed the following problems.

PBI has slight water absorbing capability, however phosphoric acid has extremely high affinity for water. Therefore, a phosphoric acid-doped PBI is liable to cause wrinkles by water absorption. Accordingly, when an MEA (a membrane electrode assembly in which a membrane and electrodes are assembled) is fabricated using the phosphoric acid-doped (wrinkled) PBI membrane and a stack is assembled, followed by operation of it, the use of the phosphoric acid-doped PBI membrane causes the leakage of gas and liquid. Further, there is a limitation of thin film formation of the phosphoric acid-doped PBI membranes.

In particular, when PBI doped with phosphoric acid at a rate of two or more molecules of per basic imidazole ring constituting PBI (one or more molecules of phosphoric acid per N—H group) is hot pressed in preparing the MEA, free phosphoric acid, not participating in bonding, seeps into an electrode layer or a diffusion layer. In a hydrogen fuel cell, therefore, phosphoric acid which has seeped out also acts as an ionomer. However, when the amount of the seeped phosphoric acid is excessive, diffusion of a reaction gas into a catalytic metal is inhibited.

The phosphoric acid that has seeped into the electrode by the above-mentioned hot pressing is not fixed, so that it is apt to seep out of the electrode when water in a gas reaction cell is condensed by interruption of the operation. Further, when the PBI membrane is immersed in condensed water in the gas reaction cell, or when the PBI membrane is immersed in water and methanol in a liquid supply direct methanol fuel cell (DMFC), phosphoric acid fixed into the PBI membrane is also easily dedoped to run out, resulting in a reduction of ion conductivity of the PBI membrane.

Inorganic phosphoric acid is a strong acid and has extremely high methanol solubility. Therefore, the PBI membranes are conventionally doped with phosphoric acid by immersing the PBI membranes having the basicity (N—H groups) in high concentrated methanol solutions of inorganic phosphoric acid. On the other hand, compounds other than inorganic phosphoric acid (for example, organic phosphoric acid compounds) are low in solubility. Accordingly, high concentrated solutions thereof can not be prepared, the acid dissociation degree of the prepared solutions is also low, and the molecular size of dopants is also large. It is therefore difficult to conduct doping by the above-mentioned immersing method.

As described above, it has been difficult to use the phosphoric acid-doped PBI membranes as the solid polymer electrolyte membranes of the liquid supply DMFCs.

SUMMARY OF THE INVENTION

The present invention has been made against a background of the current problems of the phosphoric acid-doped PBI membranes as described above, and an object of the invention is to provide a solid polymer electrolyte having no wrinkle occurred by water absorption while film formation by virtue of its low water absorption. From the acid-doped PBI membranes of the present invention, no dopant runs out even when hot pressing is carried out. And the acid-doped PBI membranes of the present invention are excellent in stability in the presence of water or methanol, and excellent in proton conductivity and methanol barrier properties.

The present inventors have conducted intensive investigation for attaining the above-mentioned object. As a result, the present inventors have discovered that a solid polymer electrolyte membrane obtained by using an acid enhanced in hydrophobicity by introducing an organic group, said acid comprising a functional group having a phenyl group substituted for a hydrogen atom of an inorganic acid, is used as a dopant instead of inorganic phosphoric acid, and mixing an imidazole ring-containing polymer with the above-mentioned dopant by a solution blend method, followed by film formation is excellent in dope stability, proton conductivity and methanol barrier properties, thus completing the present invention.

BRIEF DESCRIPTION OF THE DRAWINGS

These and other objects and advantages of this invention will become more apparent and more readily appreciated from the following detailed description of the presently preferred exemplary embodiment of the invention taken in conjunction with accompanying drawings, of which.

DETAILED DESCRIPTION OF THE INVENTION

Figure 1:
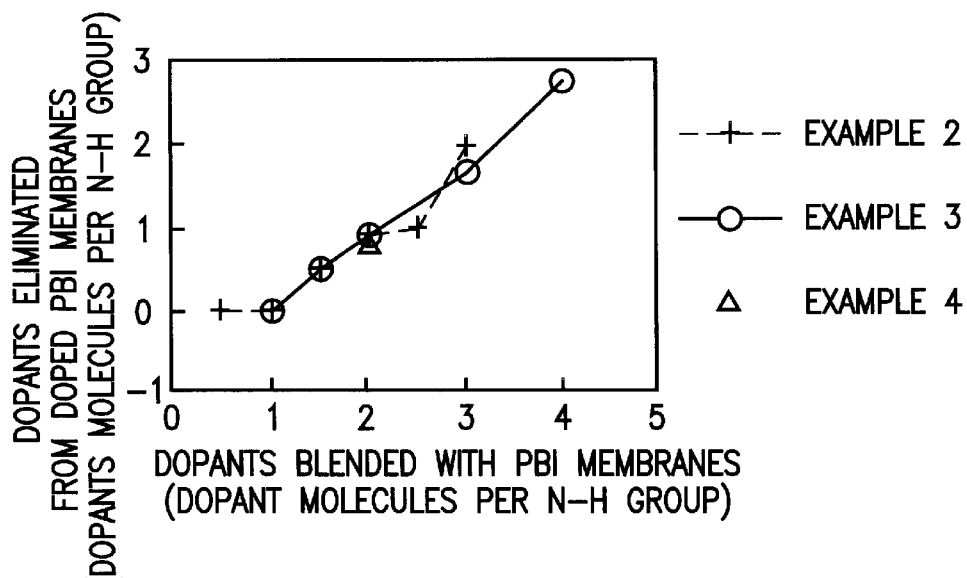
FIG. 1 is a graph showing the relationship between the amounts of dopants blended with PBI membranes and the amounts of dopants eliminated from doped PBI membranes (the dope stability)

The present invention provides a solid polymer electrolyte in which an imidazole ring-containing polymer is doped with an acid in which at least one hydrogen atom of an inorganic acid is substituted by a functional group having a phenyl group.

In this case, the imidazole ring-containing polymer is preferably a polybenzimidazole compound.

Further, the above-mentioned polybenzimidazole compound is preferably poly[2,2'-(m-phenylene)-5,5'-bibenzimidazole].

Furthermore, the above-mentioned polybenzimidazole compound is preferably poly[2,5-benzimidazole].

In addition, the above-mentioned inorganic acid is preferably phosphoric acid.

The amount of the above-mentioned acid, with which the imidazole ring-containing polymer is doped, is preferably from 1 to 10 molecules per repeating structure unit of a molecular chain of the imidazole ring-containing polymer.

The above-mentioned solid polymer electrolyte is preferably produced by a solution blend method.

A solvent used in the above-mentioned solution blend method is preferably trifluoroacetic acid.

The imidazole ring-containing polymers used in the present invention may be any polymers which have repeating structure units comprising imidazole rings which function as receptor groups for protons against acidic dopants. The imidazole ring-containing polymers show sufficient proton conductivity by means of acid doping. And acid-doped imidazole ring containing polymers are highly stable within the operating temperature range of fuel cells. Usually, the polymers having a molecular weight of 1,000 to 100,000 are used. In the case of the molecular weight of the polymers less than 1,000, the physical properties of the resulting electrolytic base materials are deteriorated. On the other hand, in the case of the molecular weight of the polymers exceeding 100,000, solubility of the polymers in solvents decreases unfavorably, therefor, it becomes difficult to form membranes.

Such imidazole ring-containing polymers include, for example, polybenzimidazole compounds and polybenzbisimidazole compounds.

Usually, the polybenzimidazole compounds can be produced from aromatic dibasic acids and aromatic tetraamines. Examples thereof include poly[2,2'-(m-phenylene)-5,5'-bibenzimidazole], poly[2,2'-(pyridylene-3",5")-5,5'-bibenzimidazole], poly[2,2'-(furylene-2",5")-5,5'-bibenzimidazole], poly[2,2'-(naphthylene-1",6")-5,5'-bibenzimidazole], poly[2,2'-(biphenylene-4",4")-5,5'-bibenzimidazole], poly[2,2'-amylene-5,5'-bibenzimidazole], poly[2,2'-octamethylene-5,5'-bibenzimidazolel, poly[2,6'-(m-phenylene)-diimidazolebenzene], poly[2',2'-(m-phenylene)-5,5'-di(bibenzimidazole)ether], poly[2',2'-(m-phenylene)-5,5'-di(benzimidazole)sulfide], poly[2',2'-(m-phenylene)-5,5'-di(benzimidazole)sulfone], poly[2',2'-(m-phenylene)-5,5'-di(benzimidazole)methane], poly[2',2"-(m-phenylene)-5,5"-di(benzimidazole)-propane-2,2] and poly [2,2'-(m-phenylene)-5',5"-di(benzimidazole)-ethylene-1,2]. Preferred examples of the polymers include poly(2,2'-(m-phenylene) -5,5'-bibenzimidazole], the structure of which is represented by general formula (I).

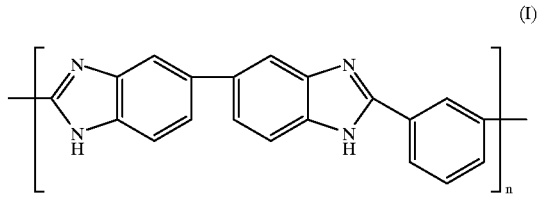

(I)

These polybenzimidazole compounds can also be produced by self-condensation of at least one kind of aromatic compounds having a pair of amine substituent groups at the ortho-positions and a carboxylate ester group positioned in an aromatic nucleus. Such aromatic compounds include, for example, diamino-carboxylic acids or esters thereof, such as 3,4-diamino-naphthalene-1-carboxylic acid, 5,6-diaminonaphthalene-2-carboxylic acid, 6,7-diaminonaphthalene-1-carboxylic acid, 6,7-diaminonaphthalene-2-carboxylic acid and 3,4-diaminobenzoic acid. Preferred examples of the polybenzimidazole compounds include poly[5-(4-phenyleneoxy)benzimidazole] obtained from 4-phenoxycarbonyl-3',4'-diaminophenyl ether, and poly[2,5(6)-benzimidazole] obtained from 3,4-diaminobenzoic acid. The structure of poly[2,5-benzimidazole] is represented by general formula (II).

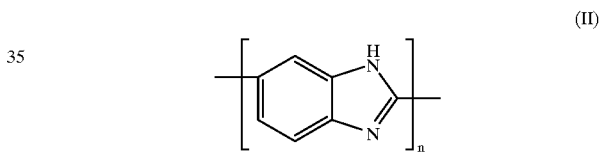

(II)

Further, examples of the polybenzbisimidazole compounds include poly[2,6'-(m-phenylene)benzbisimidazolel, poly[2,6'-(pyridylene-2",6")benzbisimidazole], poly[2,6'-(pyridylene-3",5")benzbisimidazole], poly[2,6'-(naphthylene-1",6")benzbisimidazole] and poly[2,6'-(naphthylene-2",7")benzbisimidazole. The preferable polymer is poly[2,6'-(m-phenylene)benzbisimidazole].

In the present invention, the acids used in doping, namely the dopants, are acids obtained by substituting hydrogen atoms of inorganic acids by functional groups having phenyl groups. The dopants include organic acids obtained by substituting hydrogen atoms of sulfuric acid, phosphoric acid, phosphorous acid and the like, by functional groups having phenyl groups. In particular, organic phosphoric acids can be suitably used as a dopant in the present invention.

Examples of the sulfuric acid compounds in each of which a hydrogen atom of sulfuric acid is substituted by a functional group having a phenyl group include phenylsulfuric acid.

Further, the acids in each of which at least one hydrogen atom of phosphoric acid is substituted by a functional group having a phenyl group, namely the organic phosphoric acid compounds, include phenylphosphoric acid derivatives represented by general formula (III), and diphenylphosphoric acid derivatives represented by general formula (IV)

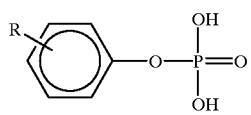

(III)

wherein R represents a hydrogen atom, an alkyl group having 1 to 5 carbon atoms, a halogen atom or a nitro group.

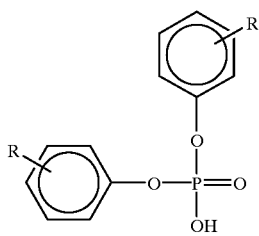

(IV)

wherein R represents a hydrogen atom, an alkyl group having 1 to 5 carbon atoms, a halogen atom or a nitro group.

Examples of the phenylphosphoric acid derivatives include alkyl-substituted phenylphosphoric acids such as phenylphosphoric acid, o-toluylphosphoric acid, p-toluylphosphoric acid, o-ethylphenylphosphoric acid, p-ethylphenylphosphoric acid and p-isopropylphenylphosphoric acid; halogen-substituted phenylphosphoric acids such as o-chlorophenylphosphoric acid, p-chlorophenylphosphoric acid and p-bromophenylphosphoric acid; and nitrophenylphosphoric acids such as m-nitrophenylphosphoric acid.

Further, examples of the diphenylphosphoric acid derivatives include di(alkyl-substituted phenyl)phosphoric acids such as diphenylphosphoric acid, di(o-toluyl)phosphoric acid, di(o-ethylphenyl)phosphoric acid, di(p-ethylphenyl)phosphoric acid and di(p-isopropylphenyl)phosphoric acid; di(halogen-substituted phenyl)phosphoric acids such as di(o-chlorophenyl)phosphoric acid, di(p-chlorophenyl) phos-phoric acid and di(p-bromophenyl)phosphoric acid; and di(nitrophenyl)phosphoric acids such as di(m-nitrophenyl)-phosphoric acid.

Furthermore, the phosphorous acid compounds used in the present invention in each of which a hydrogen atom of phosphorous acid is substituted by a functional group having a phenyl group include phenylphosphorous acid derivatives represented by general formula (V), and examples thereof include di(alkyl-substituted phenyl)phosphorous acids such as phenylphosphorous acid, diphenylphosphorous acid, di(o-toluyl)phosphorous acid, di(p-toluyl)phosphorous acid, di(o-ethylphenyl)phosphorous acid, di(p-ethylphenyl)phosphorous acid and di(p-isopropylphenyl)phosphorous acid; di(halogen-substituted phenyl)phosphorous acids such as di(o-chlorophenyl)phosphorous acid, di(p-chlorophenyl) phos-phorous acid and di(p-bromophenyl)phosphorous acid; and di(nitrophenyl)phosphorous acids such as di(m-nitrophenyl)-phosphorous acid.

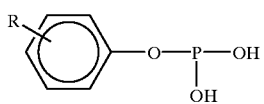

(V)

wherein R represents a hydrogen atom, an alkyl group having 1 to 5 carbon atoms, a halogen atom or a nitro group.

Usually, the doping is carried out by the following three methods:

(1) A method of immersing an imidazole ring-containing polymer film in a dopant solution (immersing method);

(2) A method of coagulating an imidazole ring-containing polymer at an interface between a solution of an imidazole ring-containing polymer and a dopant solution (interfacial coagulation method); and (3) A method of blending an imidazole ring-containing polymer with a dopant in a solution (solution blend method).

For preparing the imidazole ring-containing polymer film used in the immersing method described in the above (1), a solution of the imidazole ring-containing polymer is first prepared. Various solvents can be used for preparing this polymer solution, and examples thereof include N,N-dimethylacetamide, N,N-dimethylformamide, N,N-dimethyl sulfoxide and N-methyl-2-pyrrolidone.

In this case, the concentration of the polymer solution is preferably 5% to 30% by weight. In the case of the concentration less than 5% by weight, it becomes difficult to obtain a film having a desired thickness. On the other hand, in the case of the concentration of the polymer solution exceeding 30% by weight, it results in difficulty in preparing the uniform polymer solution.

Solvents for the dopant solutions include tetrahydrofuran (THF), methanol, ethanol, n-hexane and methylene chloride. In this case, the concentration of the dopant solution is preferably 50% to 90% by weight. In the case of the concentration less than 50% by weight, the amount of the dopant in the doped film (the dope amount) is decreased to cause reduced proton conductivity of the resulting doped film. On the other hand, in the case of the concentration of the dopant solution exceeding 90% by weight, it results in dissolution of the polymer film in the dopant solution.

The solution is prepared at a temperature of room temperature to 120° C. Usually, in order to dissolve the polymer with a solvent homogeneously, the solution is heated below the boiling point of the solvent, and cooled to room temperature. Then, the solution is adjusted so as to give a solution viscosity of 50 to 4,000 poises, preferably 400 to 600 poises (at 30° C.). The above-mentioned solution viscosity depends on the temperature, the degree of polymerization, and the concentration of the polymer solution. In general, however, in the case of the solution viscosity less than 50 poises, it is difficult to form a film. Whereas, in the case of the solution viscosity exceeding 4,000 poises, the solution viscosity becomes too high, resulting difficulty to prepare a homogeneous film.

The polymer solution thus obtained can be cast on, for example, a glass plate, and the solvent is removed by an ordinary method to prepare a film.

As solvents for the solutions of the imidazole ring-containing polymers and solvents for the dopant solutions used in the interfacial coagulation method described in the above (2), the solvents described in the above-mentioned immersing method (1) can be used.

The solvent used in the solution blend method described in the above (3) is required to dissolve not only the imidazole ring-containing polymer and the dopant, but also the acid-doped polymer produced. For this reason, the solvent such as N,N-dimethylacetamide or N-methyl-2-pyrrolidone used as the solvent for the imidazole ring-containing polymer can not be used because of their very low solubility of the acid-doped polymer produced therein. The acid-doped polymer produced is dissolved only in strong acids such as concentrated sulfuric acid and methanesulfonic acid.

However, it is difficult to treat these strong acids after film formation. The preferable solvent used in the solution blend-method (3) is trifluoroacetic acid.

In the solution blend method described in the above (3), the solution is prepared at a temperature of room temperature to 200° C., preferably from 40° C. to 120° C.

With respect to the doping of the imidazole ring-containing polymer with the organic substituting acids, the present inventors have compared the above-described three methods (1) to (3), and studied which method is industrially applicable, as described below.

With respect to the immersing method (1), films of the imidazole ring-containing polymer are immersed in dopant solutions each of which has a specified concentration, at room temperature for 48 hours, and the immersed films are dried under vacuum. The amounts of the dopant in the doped film are calculated from changes in weight before and after the doping operation.

With respect to the interfacial coagulation method (2), a solution of the imidazole ring-containing polymer in N,N-dimethylacetamide is cast on PTFE films, and sunk in solutions of the dopant in tetrahydrofuran, thereby coagulating the imidazole ring-containing polymer at an interface of both solutions, followed by drying under vacuum. Then, the amounts of the dopant in the doped films are calculated from changes in weight before and after the doping operation.

With respect to the solution blend method (3), a powder of the imidazole ring-containing polymer is dissolved in a strong acid such as trifluoroacetic acid, and then, specified amounts of the dopant are added thereto, followed by stirring overnight at room temperature. After the preparation, the homogenized solutions are cast on polytrifluoroethylene (PTFE) sheets, and the solvent is removed at 40° C. The amounts of the dopant in the doped films are calculated from the charged amount ratios of the imidazole ring-containing polymer to the dopant.

Then, for examining the stability of the doped films, the doped films obtained by the above-mentioned respective methods (1) to (3) are dried under vacuum. Each film is set in a glass filter, and extracted by the Soxhlet's extraction method with period of time. The film is taken out together with the glass filter, and dried under vacuum. The amount of the eliminated dopant is measured by a decrease in weight.

Of these, results of the study of the immersing method described in the above (1) are shown in Table 1, and results of the study of the interfacial coagulation method described in the above (2) are shown in Table 2.

That is to say, PBI (poly[2,2'-(m-phenylene)-5,5'-bibenzimidazole]) films having a thickness of 30 μm were immersed in methylphosphoric acid/THF solutions, methylphosphoric acid/MeOH solutions, phenylphosphonic acid/THF solutions, and di (2-ethylhexyl) phosphoric acid/THF solutions, and results thereof are shown in Table 1. In the interfacial coagulation method (2), a 10 wt. % solution of PBI (poly[2,2'-(m-phenylene)-5,5'-bibenzimidazole]) in DMAc was cast on PTFE films, which were rapidly sunk in methylphosphoric acid/THF solutions, thereby carrying out doping and coagulation at the same time.

TABLE 1

Immersing Method

| | Before Treatment | | After Film Immersion Treatment | | | |
|---|---|---|---|---|---|---|
| Dopant Concentration (%) | Weight of Sample (g) | Unit Number of PBI | Weight Of Sample (g) | Change In Weight (g) | Amount of Organic Phosphoric Acid (× $10^{-4}$) (mol) | Amount of Organic Phosphoric Acid (mol/PBI unit) |
| Methylphosphoric Acid/THF | | | | | | |
| 100 | 0.0440 | 0.0002 | 0.1146 | 0.0706 | 6.30 | 4.11 |
| 90 | 0.0457 | 0.0002 | 0.1087 | 0.0630 | 5.62 | 3.53 |
| 80 | 0.0570 | 0.0002 | 0.1178 | 0.0608 | 5.43 | 2.73 |
| 70 | 0.0450 | 0.0002 | 0.0987 | 0.0537 | 4.79 | 3.05 |
| 60 | 0.0488 | 0.0002 | 0.0893 | 0.0405 | 3.62 | 2.12 |
| Methylphosphoric Acid/MeOH | | | | | | |
| 100 | 0.0448 | 0.0002 | 0.1193 | 0.0705 | 6.29 | 3.70 |
| 90 | 0.0443 | 0.0002 | 0.1180 | 0.0737 | 6.58 | 4.26 |
| 80 | 0.0486 | 0.0002 | 0.1156 | 0.0670 | 5.98 | 3.53 |
| 70 | 0.0484 | 0.0002 | 0.1084 | 0.0600 | 5.36 | 3.17 |
| Phenylphosphonic Acid/THF | | | | | | |
| 60 | 0.0465 | 0.0002 | 0.0580 | 0.0115 | 0.727 | 0.45 |
| 50 | 0.0475 | 0.0002 | 0.0555 | 0.0080 | 0.506 | 0.31 |
| 40 | 0.0494 | 0.0002 | 0.0548 | 0.0054 | 0.342 | 0.20 |
| Di(2-ethylhexyl)phosphonic Acid/THF | | | | | | |
| 100 | 0.0433 | 0.0002 | 0.0448 | 0.0015 | 0.0465 | 0.03 |
| 90 | 0.0427 | 0.0001 | 0.0439 | 0.0012 | 0.0372 | 0.02 |
| 80 | 0.0405 | 0.0001 | 0.0415 | 0.0010 | 0.0310 | 0.02 |
| 70 | 0.0457 | 0.0002 | 0.0469 | 0.0012 | 0.0372 | 0.02 |

TABLE 2

Interfacial Coagulation Method

| Dopant Concentration (%) | Amount of Dope Solution (g) | Molecular Number of PBI (mol) | Amount of PBI (g) | Change in Weight (g) | Amount of Organic Phosphoric Acid (mol) | Amount Of Organic phosphoric Acid (mol/PBI unit) |
|---|---|---|---|---|---|---|
| Methylphosphoric Acid/THF | | | | | | |
| 100 | 2.53 | 0.0082 | 0.45 | 0.16 | 0.0015 | 0.18 |
| 90 | 4.55 | 0.0148 | 0.80 | 0.71 | 0.0063 | 0.43 |
| 80 | 5.04 | 0.0163 | 0.89 | 1.94 | 0.0173 | 1.06 |

In the immersing method described in (1), methylphosphoric acid is liquid at room temperature, and dissolves in MeOH at high concentration, like inorganic phosphoric acid. However, when methylphosphoric acid is used as a dopant, the doping rate at a concentration of 70% or more is inferior to phosphoric acid (see Table 1). Therefore, a methylphosphoric acid doped product on the level of 5 molecules per PBI unit can not be obtained, whereas a phosphoric acid doped product on the same level is easily obtained. Phenylphosphonic acid is solid, and dissolved in THF in an amount of about 60%. However, when phenylphosphonic acid is used, the doping rate becomes lower than that of methylphosphoric acid (see Table 1). Di(2-ethylhexyl) phosphoric acid is liquid at ordinary temperature and entirely insoluble in water and Methanol. Therefore, using di(2-ethylhexyl)phosphoric acid, the doping can be hardly performed in spite of high concentrated solutions (see Table 1). These results of the doping of the PBI membranes with the organic phosphoric dopant solutions have revealed that it is difficult to obtain a doped membrane containing a dopant at a high concentration such as that obtained in the case of inorganic phosphoric acid. Because, the high concentrated solutions of the organic phosphoric dopants show reduced doping ability, and it is difficult to prepare of a high concentrated solution owing to a reduction in solubility of the dopant.

Further, the results of the interfacial coagulation method described in (2) have indicated that not only the dopant solutions are significantly coagulated and gelled on the film interfaces preventing an increase in the doping rate, but also the films easily to wrinkle by the doping, resulting in the difficulty of putting them to practical use.

In the solution blend method described in (3) preferably used in the present invention, the dope amounts (mol) of the acids per unit of the polymers are calculated from the above-mentioned dope amounts (increases in weight), and the weight of the polymers before treatment, and the amounts of eliminated dopants (dope acid stability) are compared and studied. The results thereof have revealed that the amounts of dopants eliminated from the doped films obtained by the solution blend method are small. Further, the dope amount (mol) of the above-mentioned acid ranges from 1 to 10 molecules based on a repeating structure unit of a molecular chain of the polymer of the doped film obtained by the solution blend method (from 0.5 to 5 molecules per N—H group in a repeating structure unit)

This dope amount is 10 molecules or less, and preferably from 1 to 6 molecules, per a repeating structure unit of a molecular chain of the imidazole ring-containing polymer. In the case of exceeding 10 molecules, it results in failure to form a solid membrane shape.

Thus, the solid polymer electrolyte membranes obtained by the solution blend method described in (3) exhibit decreased water absorption achieved by the doping, so that no wrinkles are developed by water absorption. Further, the dope stability in aqueous solutions of methanol, which is required in using the membranes in liquid supply type direct methanol fuel cells (DMFCs), is also substantially improved, compared with inorganic phosphoric acid. Furthermore, the solid polymer electrolyte membranes obtained by the solution blend method are excellent in proton conductivity and methanol barrier properties, and useful as solid polymer electrolyte membranes for fuel cells.

The present invention will be illustrated with reference to examples in more details below, but these examples are not intended to limit the scope of the present invention. Parts and percentages in the examples and comparative examples are on a weight basis, unless otherwise specified.

Main materials used in the examples and comparative examples are as follows:

(1) Polybenzimidazole (PBI) Resin

Poly[2,2'-(m-phenylene)-5,5'-bibenzimidazole] was used as a polybenzimidazole (PBI) resin, an imidazole ring-containing polymer. PBI powder (trade name: CELAZOLE) manufactured by Aldrich Co. was dissolved in dimethylacetamide at a concentration of 10%, and the resulting solution was filtered under pressure. Then, the solution was coagulated in distilled water, and the resulting purified product was used after vacuum drying. The term "PBI" as used in the examples hereinafter means poly[2,2'-(m-phenylene)-5,5'-bibenzimidazole].

(2) Preparation of Polybenzimidazole (PBI) film

The above-prepared PBI powder was dissolved in DMAc at a concentration of 15%, and cast with a doctor blade. Then, the solvent was removed at 40C. The residue was boiled in distilled water, and dried under vacuum to obtain 30 μm and 33 μm thick films (PBI membranes). Using the 30 μm thick PBI membrane, the doping was conducted by the immersing method described in the above (1). The 33 μm thick PBI membrane was used as a non-doped PBI membrane in Reference Example 2.

(3) Poly[2,5-benzimidazole] (2,5-PBI) Resin

A 2,5-PBI resin was synthesized according to the description of Y. Imai, Macromol. Chem., Vol.85, p179, (1965). One gram of 3,4-diaminobenzoic acid was heated in 35 g-of 116% polyphosphoric acid at 160° C. for 1.5 hours to obtain a polymer. The resulting polymer was neutralized in a 4% aqueous solution of $NaHCO_3$ overnight, and washed with water and methanol, followed by vacuum drying at 120° C., thus obtaining 2,5-PBI. The inherent viscosity $\eta_{inh}$ of 2,5-PBI thus obtained was 0.36. 2,5-PBI heated for 6 hours and 12 hours showed inherent viscosities of 0.71 and 0.86, respectively. The inherent viscosity $\eta_{inh}$ was calculated from the viscosity of a 5 g/liter solution of 2,5-PBI in concentrated sulfuric acid measured by means of a capillary viscometer. In the present invention, the above-prepared 2,5-PBI having a inherent viscosity of 0.86 was used.

(4) Phosphoric Acid and Organic Phosphoric Acid Compounds

As phosphoric acid and organic phosphoric acid compounds, commercially available ones were used as such. That is to say, phenylphosphoric acid (R=H in general formula (I)) and diphenylphosphoric acid (R=H in general formula (II)) were used in the examples, and phosphoric acid [HO-P(O)(OH)$_2$], methylphosphoric acid [MeO-P(O)(OH)$_2$], di(2-ethylhexyl)phosphoric acid [$(C_8H_{18}O)_2P(O)OH$], di(n-butyl)phosphoric acid [$(n-BuO)_2P(O)OH$] and phenylphosphonic acid [general formula (VI)] were used in the comparative examples.

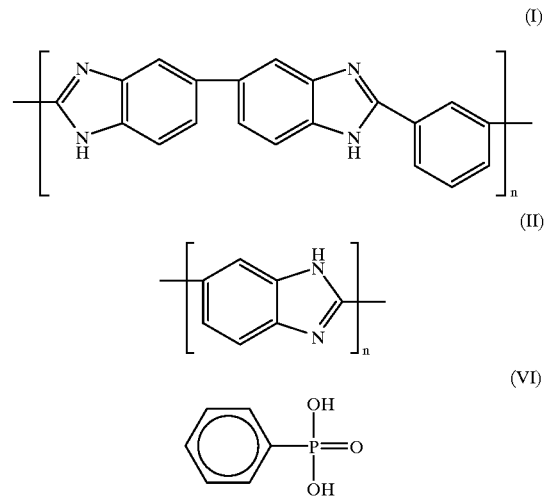

EXAMPLES 1 AND 2 AND COMPARATIVE EXAMPLES 1 TO 5 (Preparation of Doped PBI Membranes by Solution Blend Method)

In 20 ml (concentration: 10%) of trifluoroacetic acid, 2.000 g of the PBI powder was dissolved, and each dopant shown in Table 3 was added thereto in an amount shown in Table 3, followed by stirring at room temperature overnight. Each homogenized solution was cast on a PTFE sheet, and the solvent was removed at 40° C., followed by vacuum drying at 80° C., thus obtaining a doped PBI membrane. The molecular number of the dopant per PBI unit (dope molecular number/PBI unit) was calculated from the amounts of the PBI powder and the dopant charged. The PBI membrane doped with di(2-ethylhexyl)phos-phoric acid in Comparative Example 3 was insoluble in the solvent, resulting in failure to form a film. Further, the doped PBI membrane having 5 molecules of phenylphosphonic acid per PBI unit obtained in Comparative Example 5 was also insoluble in the solvent, so that it could not form a film.

TABLE 3

| | Kind of Dopant | Amount of Dopant (g) | Dope Amount (Dope Molecular Number/ PBI unit) |
|---|---|---|---|
| Example | | | |
| 1a | Phenylphosphoric Acid | 1.130 | 1 |
| 1b | " | 2.258 | 2 |
| 1c | " | 5.650 | 5 |
| 2a | Diphenylphosphoric Acid | 1.620 | 1 |
| 2b | " | 3.240 | 2 |
| 2c | " | 8.110 | 5 |
| Comparative Example | | | |
| 1a | Phosphoric Acid | 0.635 | 1 |
| 1b | " | 1.270 | 2 |
| 1c | " | 3.180 | 5 |
| 2a | Methylphosphoric Acid | 0.727 | 1 |
| 2b | " | 1.453 | 2 |
| 2c | " | 3.633 | 5 |
| 3a | Di(2-ethylhexyl)phosphoric Acid | 2.090 | 1 |
| 3b | " | 4.180 | 2 |
| 3c | " | 10.460 | 5 |
| 4a | Di(n-butyl)phosphoric Acid | 1.365 | 1 |
| 4b | " | 2.730 | 2 |
| 4c | " | 6.820 | 5 |
| 5a | Phenylphosphonic Acid | 1.025 | 1 |
| 5b | " | 2.050 | 2 |

EXAMPLES 3 and 4 (Preparation of Doped 2,5-PBI Membranes by Solution Blend Method)

With 10 ml (concentration: 10%) of trifluoroacetic acid, 2.000 g of 2,5-PBI having a inherent viscosity $\eta_{inh}$ of 0.86 was mixed, and each dopant shown in Table 4 was added thereto in an amount shown in Table 4, followed by stirring at room temperature overnight.

2,5-PBI itself was insoluble in trifluoroacetic acid at a concentration of 10%, and also insoluble even when inorganic phosphoric acid was added as a dopant. It was therefore impossible to prepare 2,5-PBI doped with phosphoric acid as a comparative example. However, when phenylphosphoric acid or diphenylphosphoric acid was added at a rate of two or more molecules per N—H group in 2,5-PBI, 2,5-PBI could be dissolved in the solution. When diphenylphosphoric acid was added at a rate of one molecule per N—H group, heating at 80° C. was required for dissolving at a 2,5-PBI concentration of 10%. In the case of the concentration of diphenylphosphoric acid higher than 10%, it was dissolved at room temperature. Each dissolved (homogenized) solution was cast on a PTFE sheet, and the solvent was removed at 40° C., followed by vacuum drying at 80° C., thus obtaining a doped 2,5-PBI membrane. Using a diphenylphosphoric acid solution of a concentration of not more than 4 molecules/N—H group, a film could be formed. However, from a diphenylphosphoric acid solution of a concentration of higher than 4 molecules/N—H group, no solidification occurs, even when the solvent was totally removed. The dope amount was calculated from the amounts of 2,5-PBI and the dopant charged.

TABLE 4

| Example | Kind of Dopant | Dope Amount (Dope Molecular Number/N-H group) |
|---|---|---|
| 3a | Diphenylphosphoric Acid | 1.0 |
| 3b | " | 1.5 |
| 3c | " | 2.0 |
| 3d | " | 3.0 |
| 3e | " | 4.0 |
| 4a | Penylphosphoric Acid | 2.0 |

Evaluation Methods

Dope Stability (Dopant Elimination Rate)

The dope stability was evaluated by the Soxhlet's extraction method. Each film was set in a glass filter, and extracted with 1 M aqueous solution of methanol for a specified period of time at a temperature of 85° C. to 90° C. After extraction, the film was taken out together with the glass filter, and dried under vacuum. The amount of the eliminated dopant is measured from a decrease in weight.

For the doped PBI membranes and the doped 2,5-PBI membranes of Examples 1 to 4 and Comparative Examples 1, 2 and 5, the film stability was evaluated. The amounts of the dopants eliminated from the PBI membranes are shown in Table 5 as the dopant molecular number per PBI unit, and the amounts of the dopants eliminated from the 2,5-PBI membranes are shown in Table 6 as the dope molecular number per N—H group. Two N—H groups are contained in one PBI unit. The relationship between the amounts of the eliminated dopants (molecular number per N—H group) and the amounts of the blended dopants (molecular number per N—H group) of the doped PBI membranes of Examples 2 to 4 is shown in FIG. 1.

TABLE 5

| | Kind of Dopant | Dope Amount (dope molecular number/PBI unit) | Amount of Eliminated Dopant (molecule/ PBI) | Elimination Rate (%) |
|---|---|---|---|---|
| Example | | | | |
| 1a | Phenylphosphoric Acid | 1 | 0.48 | 48.40 |
| 1b | Phenylphosphoric Acid | 2 | 0.73 | 36.42 |
| 1c | Phenylphosphoric Acid | 5 | 3.10 | 62.01 |
| 2a | Diphenylphosphoric Acid | 1 | 0.00 | 0.00 |
| 2b | Diphenylphosphoric Acid | 2 | 0.00 | 0.00 |
| 2c | Diphenylphosphoric Acid | 5 | 2.02 | 40.44 |
| Comparative Example | | | | |
| 1a | Phosphoric Acid | 1 | 0.69 | 69.01 |
| 1b | Phosphoric Acid | 2 | 1.35 | 67.72 |

TABLE 5-continued

| | Kind of Dopant | Dope Amount (dope molecular number/PBI unit) | Amount of Eliminated Dopant (molecule/ PBI) | Elimination Rate (%) |
|---|---|---|---|---|
| 1c | Phosphoric Acid | 5 | 3.38 | 67.57 |
| 2a | Methylphosphoric Acid | 1 | 0.89 | 88.67 |
| 2b | Methylphosphoric Acid | 2 | 1.90 | 94.80 |
| 2c | Methylphosphoric Acid | 5 | 4.99 | 99.98 |
| 5a | Phenylphosphonic Acid | 1 | 0.76 | 75.95 |
| 5b | Phenylphosphonic Acid | 2 | 1.47 | 73.28 |

TABLE 6

| Example | Kind of Dopant | Dope Amount (molecular number/ N-H unit) | Amount of Eliminated Dopant (molecule/ N-H group) | Elimination Rate (%) |
|---|---|---|---|---|
| 3a | Diphenylphosphoric Acid | 1.0 | 0.0 | 0.0 |
| 3b | Diphenylphosphoric Acid | 1.5 | 0.6 | 40.0 |
| 3c | Diphenylphosphoric Acid | 2.0 | 0.9 | 45.0 |
| 3d | Diphenylphosphoric Acid | 3.0 | 1.7 | 56.7 |
| 3e | Diphenylphosphoric Acid | 4.0 | 2.8 | 70.0 |
| 4a | Phenylphosphoric Acid | 2.0 | 0.8 | 40.0 |

From the results of Table 5, with respect to the PBI membranes doped with almost dopants, it is apparent that the amounts of the eliminated dopants from the membranes doped with a dopant at a rate of 5-molecule per PBI unit are larger than that of the membranes doped with a dopant at a rate of two molecules or less per PBI unit. The PBI molecule has two sites (N—H groups) per unit that can interact with phosphoric acid groups, and a dopant introduced in an amount exceeding two molecules per PBI unit is presumed to be in a relatively free state. There is therefore no contradiction in this fact.

With respect to the mono-substituted acids, methylphosphoric acid of Comparative Example 2 shows an elimination rate equal to or more than that of inorganic phosphoric acid of Comparative Example 1. On the other hand, in the case of phenylphosphoric acid of Example 1, the elimination is depressed to less than half those of the above-mentioned acids. Further, for diphenylphosphoric acid that is a di-substituted acid, no elimination is observed at all at a dope rate of 1 to 2 molecules per PBI unit. This apparently indicates that the stability of the dopant at basic sites (N—H groups) of the PBI molecule.

From the results of FIG. 1, the doped PBI membranes and the doped 2,5-PBI membranes showed similar dope stability. That is to say, in the doped PBI membranes and the doped 2,5-PBI membranes, one molecule of dopant per N—H group remained even after methanol extraction, and the membranes were stabilized.

From the results of Tables 5 and 6, the diphenylphosphoric acid-doped PBI membrane of Example 2b and diphenylphosphoric acid-doped 2,5-PBI membrane of Example 3a, each having one molecule of diphenylphosphoric acid per N—H group, showed good stability.

Proton Conductivity

The proton conductivity of each PBI film was measured for the vacuum dried membrane in a dried state by the four-terminal method. For the measurement, the complex impedance was measured at 750 mV with an impedance analyzer "YHP 4192A" manufactured by YOKOGAWA-HEWLETT PACKARD, LTD., and the direct current component R was obtained by Cole-Cole plots. Then, the proton conductivity was calculated therefrom. Results thereof are shown in Table 7 and FIG. 2.

The proton conductivity of each 2,5-PBI film was measured and calculated in the same manner as described above with the exception that the two-terminal method was used in place of the four-terminal method. Further, as Reference Example 1, the proton conductivity of Nafion 112 (manufactured by E. I. du Pont de Nemours and Company) was measured and calculated. Results thereof are shown in Table 7 and FIG. 3.

TABLE 7

| | Proton Conductivity ($\times 10^{-3}$) (S/cm) | | | |
|---|---|---|---|---|
| Conditions Temperature (° C.) | Example 2b Doped PBI (1 molecule of diphenylphosphoric acid/ N-H group) | Example 3a Doped 2,5-PBI (1 molecule of diphenylphosphoric acid/ N-H group) | Example 3B Doped 2,5-PBI (1.5 molecules of diphenylphosphoric acid/ N-H group) | Reference Example 1 Nafion 112 |
| 65 | — | — | — | 45 |
| 75 | 0.51 | 7.9 | 11 | 38 |
| 80 | — | — | — | 31 |
| 85 | — | — | — | 21 |
| 100 | 0.84 | 9.4 | 18 | — |
| 125 | 1.7 | 8.8 | 26 | — |

Figure 2:
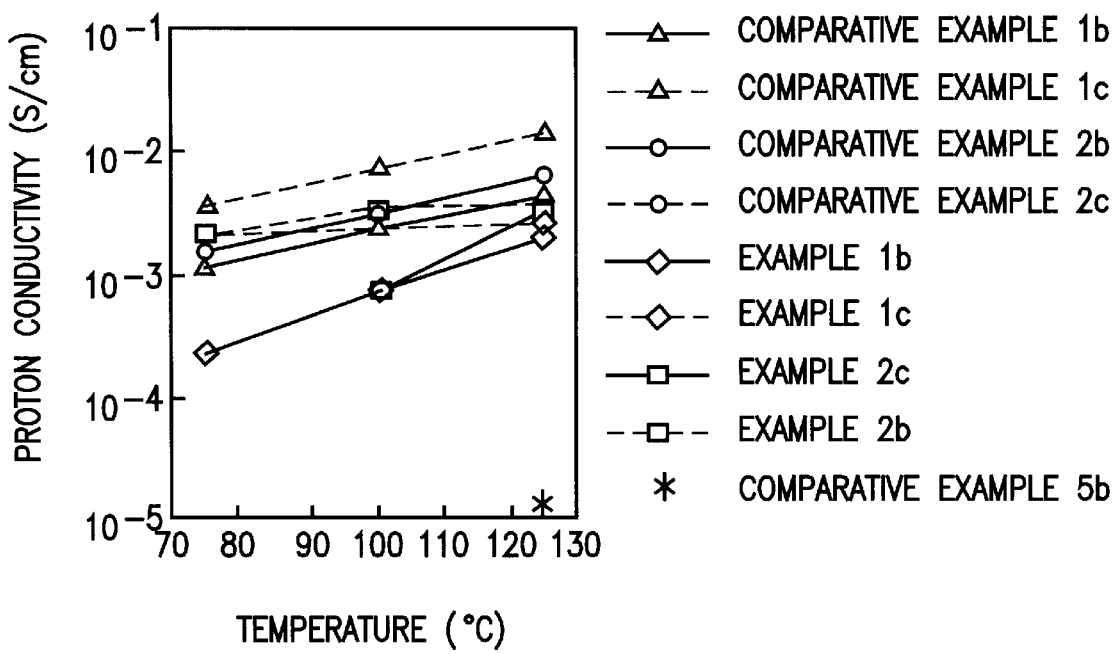
FIG. 2 is a graph showing the proton conductivity of doped PBI membranes as a function of temperature.

As shown in FIG. 2, by use of phenylphosphoric acid or diphenylphosphoric acid as a dopant, doped membranes at a rate of 5 molecules per PBI unit (2.5 molecules per N—H group) showed conductivity similar to that of the membranes doped with phosphoric acid at a rate of 2 molecules per PBI unit (1 molecule per N—H group). In the case that PBI is doped with inorganic phosphoric acid (liquid state at room temperature) at a rate of two or more molecules, excessive free phosphoric acid not participating in bonding with the N—H groups seeps out from the doped membranes, owing to the pressure of hot pressing or stack assembling in preparing an MEA (membrane electrode assembly). However, from these solid acids (doped membranes) doped with phenylphosphoric acid and the like, the dopants hardly seep out by pressing, so that the dopants can be introduced in somewhat larger amounts by the solution blend method. Therefore, the solution blend method can overcome the defect that the acid dissociation degree thereof is lower than that of inorganic phosphoric acid.

As shown in FIG. 2, methylphosphoric acid of Comparative Example 2, having the structure that hydrogen of a hydroxyl group of phosphoric acid is substituted by methyl, was used as a dopant. Conductivity measured in Comparative Example 2 was similar to that of phosphoric acid in Comparative Example 1. Further, in Comparative Example 5 in which phenylphosphonic acid having the structure that a hydroxyl group of phosphoric acid is substituted by phenyl, the conductivity was extremely low even in a high temperature region.

Figure 3:
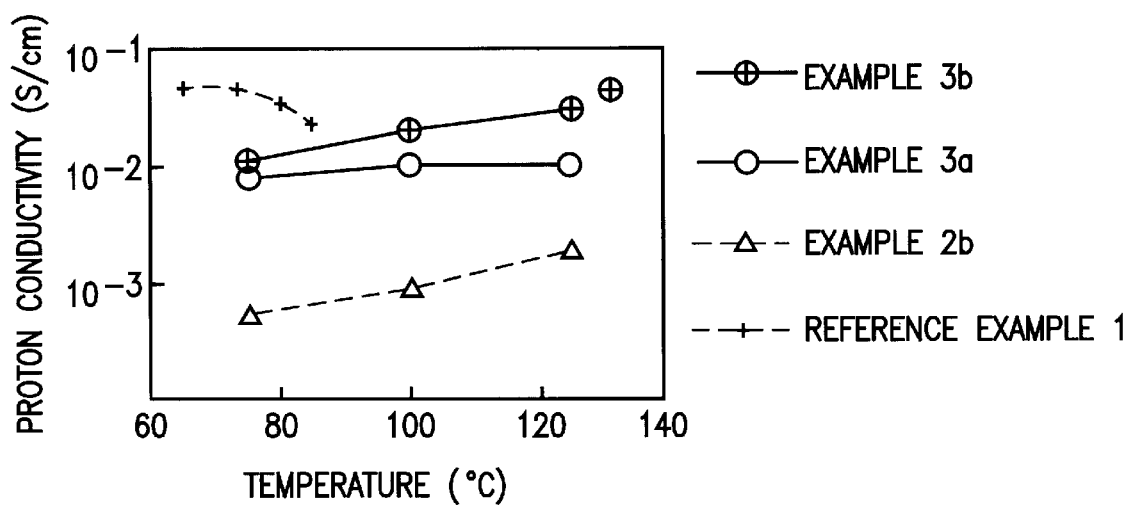
FIG. 3 is a graph showing the proton conductivity of doped PBI membranes as a function of temperature.

As shown in FIG. 3, the diphenylphosphoric acid-doped 2,5-PBI membranes of Examples 3a and 3b showed higher conductivity than the diphenylphosphoric acid-doped PBI membrane of Example 2a. This is because N—H density of 2,5-PBI is higher than that of PBI. However, the conductivity of the doped 2,5-PBI membranes was lower than that of Nafion 112 of Reference Example 1 which has been generally used at present. This is because the conductivity of phosphoric acid-doped PBI is originally considerably lower than that of Nafion, and moreover, because the acid dissociation degree of diphenyl phosphoric acid, in which two hydrogen atoms of phosphoric acid are substituted by phenyl groups, is lower than that of phosphoric acid.

Water Absorption of Film

Each dried doped film was allowed to stand in an atmosphere of saturated water vapor of 80 C for 6 hours, and changes in weight thereof were measured.

Seepage of Dopant in Pressing

Each dried doped film was placed between two PTFE sheets and pressed at 224 kgf/cm$^2$ for 10 minutes, and changes in weight thereof were measured.

The ratios (%) of the amounts of water absorption (changes in weight after 6 hours under saturated water vapor at 80° C.) and the seeping amounts of dopants (changes in weight after pressing at 224 kgf/cm$^2$) to the initial amounts of the phenylphosphoric acid-doped PBI membranes and the diphenylphosphoric acid-doped PBI membranes of Examples 1 and 2, the phosphoric acid-doped PBI membranes of Comparative Examples 1b and 1c, and a non-doped PBI membrane of Reference Example 2 are shown in Table 8.

TABLE 8

| | Dopant | Dope Amount (Dope Molecular Number PBI unit) | Change in Weight after Water Absorption (%) | Change in Weight after Pressing (%) |
|---|---|---|---|---|
| Example | | | | |
| 1b | Phenylphosphoric Acid | 2 | 3.77 | — |
| 1c | Phenylphosphoric Acid | 5 | 5.63 | −0.43 |
| 2a | Diphenylphosphoric Acid | 2 | 2.40 | — |
| 2c | Diphenylphosphoric Acid | 5 | 4.89 | −0.65 |
| Comparative Example | | | | |
| 1b | Phosphoric Acid | 2 | 6.51 | — |
| 1c | " | 5 | 10.82 | −19.01 |
| Reference Example 2 (Intact PBI) | Not used | — | 6.27 | — |

When the dopants were phenylphosphoric acid or diphenylphosphoric acid in Examples 1 and 2, the amounts of water absorption were small, and the decreases of weight by pressing were extremely small, compared with that of Comparative Example 1 in which phosphoric acid is used. Like this, the organic phosphoric acid-doped PBI membranes are low in water absorption, and the dopants are suppressed to run out of them by pressing. The dopants can therefore be introduced in membranes in somewhat larger amounts.

Methanol Barrier Properties

A 1 M aqueous solution of methanol pressurized to 0.5 kgf/cm$^2$ was supplied to an anode chamber at a rate of 0.5 ml/minute, and a permeated material exhausted from a cathode chamber through a 3 cm square cell heated to a temperature of 70° C. was collected with a cold trap. The permeation amount of methanol (g/cm$^2$) was calculated from the weight of the permeated material and the composition determined by gas chromatographic analysis. Thus obtained permeation amounts of methanol were employed as evaluation results of methanol permeability.

The permeation amounts of methanol were measured for the diphenylphosphoric acid-doped 2,5-PBI membrane (having a film thickness of 70 μm) of Example 3a, the non-doped PBI membrane of Reference Example 2 (having a film thickness of 33 μm) and a Nafion 117 membrane (manufactured by E. I. du Pont de Nemours and Company) (having a film thickness of 201 μm) of Reference Example 3. Results thereof are shown in FIG. 4 and Table 9.

TABLE 9

| | Test Time (min.) | Total Amount of Permeated Material (g) | Permeation Amount of Methanol (× 10$^{-3}$) (g) | Permeation Speed of Methanol (× 10$^{-6}$) [g/(cm$^2$ · min.)] |
|---|---|---|---|---|
| Example 3a | | | | |
| | 30 | 0.08 | 0.491 | 1.82 |
| | 60 | 0.16 | 0.982 | 1.82 |
| | 120 | 0.24 | 1.47 | 1.36 |
| Reference Example 2 (Non-doped PBI) | | | | |
| | 15 | 0.21 | 0.908 | 6.73 |
| | 60 | 0.41 | 1.77 | 3.28 |
| | 125 | 0.57 | 2.47 | 2.19 |
| Reference Example 3 (Nafion 117) | | | | |
| | 5 | 0.75 | 49.8 | 1110 |
| | 15 | 1.93 | 128 | 949 |
| | 30 | 4.66 | 309 | 1150 |

Figure 4:
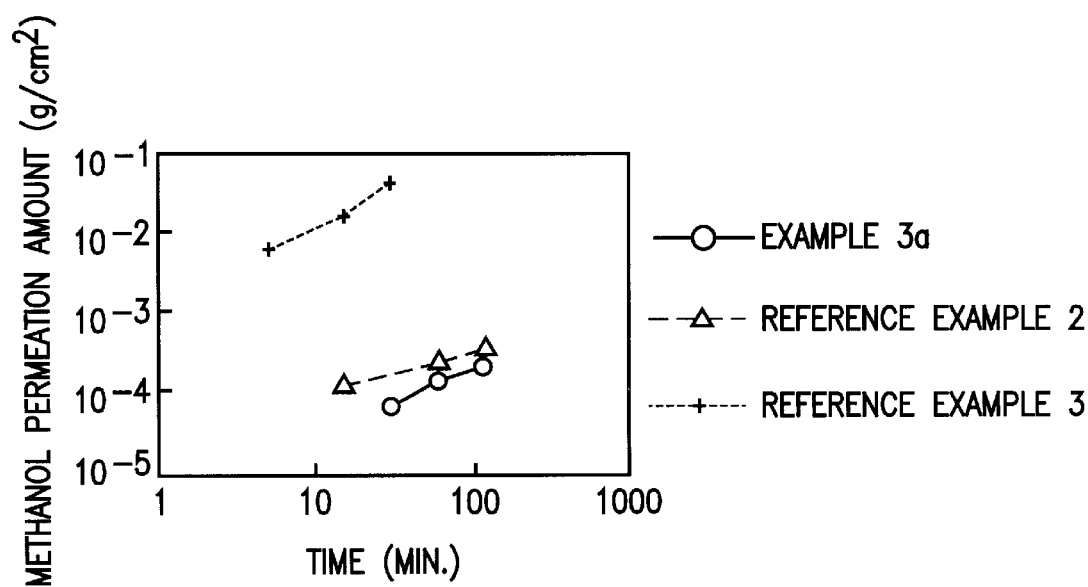
FIG. 4 is a graph showing the methanol permeation amounts of a doped PBI membrane as a function of times.

From the results of FIG. 4 and Table 9, the diphenylphosphoric acid-doped 2,5-PBI membrane showed methanol barrier properties similar to those of the non-doped PBI membrane. From this fact, it is apparent that the methanol barrier properties are hardly affected even if the higher-order structure of 2,5-PBI is changed by doping. The permeation amount of methanol of the diphenylphosphoric acid-doped 2,5-PBI membrane was about one-tenth that of the Nafion 117 membrane having a thickness about 3 times that of the 2,5-PBI membrane.

In general, the methanol permeation of a solid polymer electrolyte membrane for direct methanol fuel cells (DMFCs) is considered to occur according to two kinds of mechanisms. One kind of mechanism is due to the structure of a membrane material. And the other one is caused in conjunction with proton hopping owing to electric power generation. However, the latter proton hopping is considered to be substantially about 0 in a PBI membrane in which proton transmission occurs in a non-hydrated state [D. Weng, J. S. Wainright, U. Landau, and R. F. Savinell, J. Electrochem. Soc., Vol.143, No.4, p1260, April (1996)]. Accordingly, when the above-mentioned membranes are incorporated in fuel cells to carry out electric power generation, the difference in the permeation amount of methanol between the PBI membrane and the Nafion membrane is likely to be further widened. The PBI membrane of the present invention is therefore excellent in methanol barrier properties, compared with the Nafion membrane.

The solid polymer electrolytes of the present invention in which the imidazole ring-containing polymers are doped with the acids in which hydrogen atoms of inorganic acids are substituted by the functional groups having phenyl groups are superior to the conventional inorganic phosphoric acid-doped PBI membranes in stability, and can be used at substantially high doping rates. In particular, the 2,5-PBI membranes are low in water absorption, and excellent in durability, proton conductivity and methanol barrier properties, so that they are useful as the solid polymer electrolytes for fuel cells, particularly as the solid polymer electrolyte membranes for DMFCs.

What is claimed is:

1. A solid polymer electrolyte in which poly {2,5-benzimidazole] is doped with an acid in which at least one hydrogen atom of an inorganic acid is substituted by a functional group having a phenyl group.

2. The solid polymer electrolyte according to claim 1 wherein the amount of the acid with which the imidazole ring-containing polymer is doped is from 1 to 10 molecules per repeating structure unit of a molecular chain of the imidazole ring-containing polymer.

3. The solid polymer electrolyte according to claim 1, wherein said imidazole ring-continuing polymer is poly[2,2'-(m-phenylene)-5,5'-bibenzimidazole].

4. The solid polymer electrolyte according to claim 3 wherein the amount of the acid with which the imidazole ring-containing polymer is doped is from 1 to 10 molecules per repeating structure unit of a molecular chain of the imidazole ring-containing polymer.

5. In a process for producing a solid polymer electrolyte according to claim 1, the improvement which comprises producing said solid polymer electrolyte by a solution blend method.

6. The process of claim 5, wherein a solvent used in the solution blend method is trifluoroacetic acid.

7. A solid polymer electrolyte in which poly {2,5-benzimidazole] is doped with phosphoric acid in which at least one hydrogen atom of the acid is substituted by a functional group having a phenyl group.

8. The solid polymer electrolyte according to claim 7, wherein the amount of the acid with which the imidazole ring-containing polymer is doped is from 1 to 10 molecules per repeating structure unit of a molecular chain of the imidazole ring-containing polymer.

9. The solid polymer electrolyte according to claim 7 wherein said imidazole ring-containing polymers is poly[2,2'-(m-phenylene)-5,5'-bibenzimidazole.

10. The solid polymer electrolyte according to claim 8 wherein the amount of the acid with which the imidazole ring-containing polymer is doped is from 1 to 10 molecules per repeating structure unit of a molecular chain of the imidazole ring-containing polymer.

11. In a process for producing a solid polymer electrolyte according to claim 7, the improvement which comprises producing said solid polymer electrolyte by a solution blend method.

12. The process of claim 11, wherein the solvent used in the solution blend method is trifluoroacetic acid.

* * * * *